Oct. 1, 1957
J. R. BURNS
2,807,828
AUTOMOBILE DOOR HINGE
Filed Feb. 4, 1955
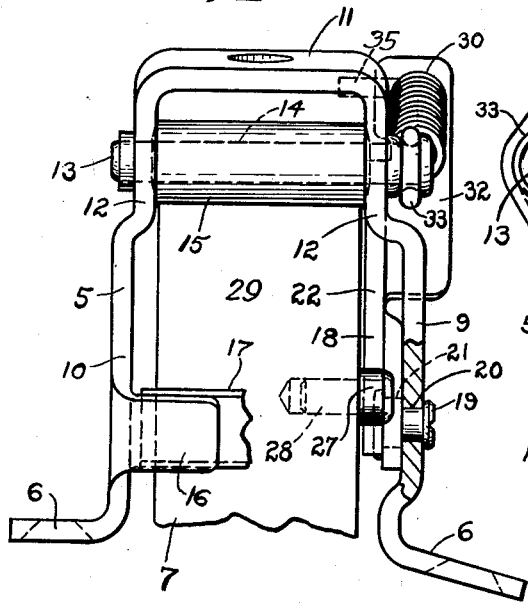
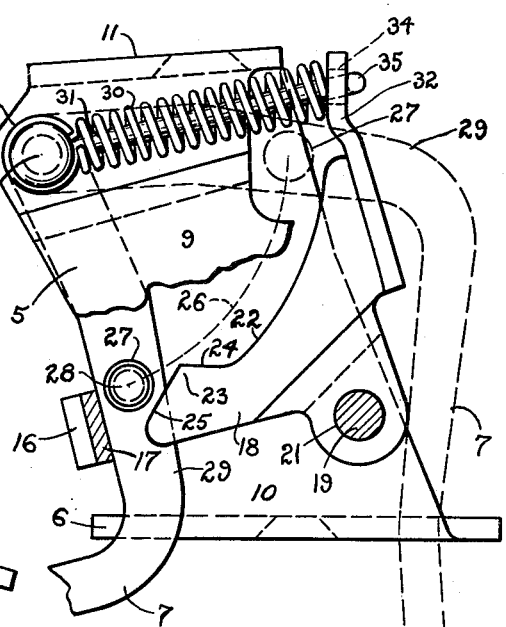
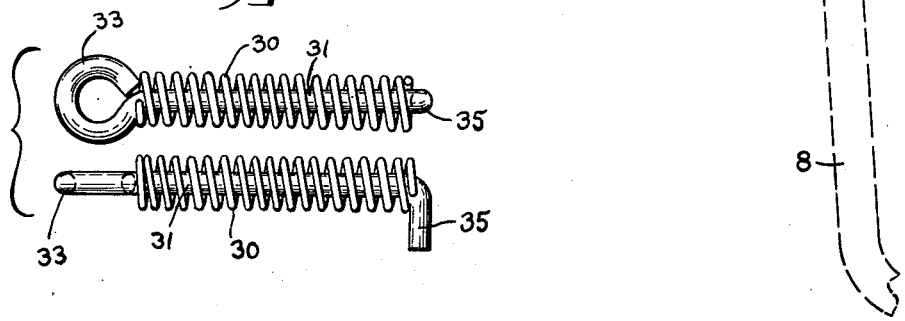
Inventor
James Reed Burns
Atty.

United States Patent Office 2,807,828
Patented Oct. 1, 1957

2,807,828

AUTOMOBILE DOOR HINGE

James Reed Burns, Rockford, Ill., assignor to Atwood Vacuum Machine Company, Rockford, Ill., a corporation of Illinois Application February 4, 1955, Serial No. 486,049

5 Claims. (Cl. 16—146)

This invention relates to hinges for the doors of automobiles and trucks and is more particularly concerned with the provision of hold-open means designed to prevent accidental closing of the door when fully opened.

Various designs of hold-open means have been proposed but many are too complicated and expensive in construction and impractical for various reasons. It is, therefore, the principal object of my invention to provide hold-open means of simpler and less expensive construction designed to give satisfactory performance throughout the life of the car without ever requiring any attention.

In accordance with my invention an elongated cam lever, which may be stamped from sheet metal at low cost, is pivotally mounted intermediate its ends on a rivet on one of the horizontal walls of the sheet metal cage of a concealed hinge and has a coiled compression spring caged in compressed condition between one end of the cam lever and an enlarged loop formed on one end of a wire link that is slidably pivotally connected at its opposite end to the cam lever, the loop end of the link being pivotally attached to the head end of the hinge pintle. The link and spring thereon are disposed outside the cage, but the cam lever is disposed inside the cage and has a projecting flange portion to which the aforesaid link is connected, and also has a profiled edge portion on which a roller mounted on a pin carried on the gooseneck portion of the inner hinge member is arranged to engage so as to deflect the cam lever and thereby compress the spring a predetermined amount when the roller rides over a hump on the cam when the door reaches the substantially fully opened position, the hump being purposely shaped with the same angularity on both sides of the high point with a view to presenting no more resistance to deflection of the cam lever in the door closing direction than in the door opening direction. With this novel spring and link assembly, the link positively limits the spring pressed return movement of the cam lever after each deflection, so that it is always correctly and accurately positioned with respect to the roller on the inner hinge member for the next operation. The use of a compression spring instead of a tension spring is preferred, especially when combined with the link on which the spring is caged, because even in the event of unlikely breakage of the spring the hold-open means will function to almost its full efficiency and will still not require any attention.

The invention is illustrated in the accompanying drawing, in which—

Fig. 1 is a rear view of Fig. 2 showing an automobile door hinge embodying hold-open means made in accordance with my invention;

Fig. 2 is a plan view of the hinge with a portion of the upper horizontal wall broken away in order to better disclose the cam lever and the cooperating roller on the inner hinge member, the parts being shown in what corresponds to the fully opened position of the door, and the inner hinge member being also indicated in dotted lines in what corresponds to the fully closed position of the door, and Fig. 3 shows two views of the sub-assembly consisting of the spring and associated wire link on which it is caged.

The same reference numerals are applied to corresponding parts in these three figures.

Referring to the drawing, the automobile door hinge shown is of the well-known concealed type similar, for example, to that shown in the Harmon et al. Patent 2,322,933, issued June 29, 1943. It comprises an outer sheet metal cage member 5 adapted to be mounted by means of its attaching flanges 6 on the door pillar on the body, and a gooseneck-shaped inner member 7 mounted on the door by means of its attaching end portion 8. The outer cage member 5 is formed from sheet metal to a generally U-shaped cross-section so as to provide opposed, substantially parallel, horizontally extending walls 9 and 10, connected by a substantially vertical wall 11. The horizontal walls 9 and 10 have embossed portions 12 forming supports for the pintle 13, which is received in a bearing hole 14 provided therefor in the enlarged end portion 15 of the inner hinge member 7. Lugs 16 are shown projecting toward one another from the edges of the top and bottom walls 9 and 10 of the outer hinge member, and these lugs are welded to a cross-member 17, which serves as a brace for the outer hinge member.

In accordance with my invention, an elongated cam lever 18, which can be stamped from sheet metal at low cost but is preferably hardened by heat treatment to reduce wear to a minimum, is disposed in the space between the upper wall 9 of the outer hinge member 5 and the upper edge of the inner hinge member 7, as clearly appears in Fig. 1, and is pivoted intermediate its ends on a rivet 19 entered through registering holes 20 and 21 provided in the upper wall 9 and cam lever 18 respectively. The main body portion of the cam lever 18 is disposed on the inside of the outer cage member 5 and has a profiled edge 22, the major portion of the length of which is struck on an arc with pintle 13 as a center, and at one end of this arc is a V-shaped hump 23, the opposite sides 24 and 25 of which are at substantially the same angle with respect to the concentric arc 26 defining the path of movement of the roller 27 mounted on a pin 28 projecting from the upper edge of the gooseneck portion 29 of the inner hinge member 7. In this way the resistance to deflection of the cam lever presented by the coiled compression spring 30 in the door closing direction is substantially the same as in the door opening direction. The spring 30 is disposed outside the cage member 5 and is held caged under a predetermined pre-load compression on a wire return link or rod 31 that extends between the head end of the pintle 13 and a flange 32 provided on the cam lever 18, the link 31 having an enlarged loop 33 formed on one end for pivotal connection with the hinge pin 13 under the head thereof and having its other end extending freely through a relatively large hole 34 provided in the flange 32 for a slidable pivotal connection with the cam lever, the link being retained against displacement from the hole 34 by an end portion 35 that is bent at right angles, substantially normal to the plane of the loop 33. The loop 33 serves as an abutment for one end of the spring 30 and the flange 32 provides an abutment for the other end.

In operation, it should be clear from a study of Fig. 2 that the roller 27 remains out of engagement with the arcuately profiled edge 22 of the cam lever 18 throughout the major portion of the door opening movement indicated by the dotted arc 26 and it is only when the door is about two-thirds of the way open that the roller 27 rides up on the inclined edge 24 of the hump 23 and causes deflection of the cam lever 18 against the resistance of spring 30, and, of course, as soon as the roller 27 passes the high point of the hump 23, the cam lever 18 springs back to its normal position under action of the spring 30, thereby releasably holding the door in the fully opened position. Hence, the door is not hindered in any way in the first half or more of its range of opening movement and that extent of movement accounts for a large percentage of door operations, as for example, in the cramped quarters of a garage and many times when the car is parked at the curb or in a parking lot and wherever full opening is either not possible or not advisable. It is rarely that one needs to swing the door all the way open but when that is necessary, the present hold-open means comes into play and gives a reliable hold-open action. The cross-piece 17 positively limits the opening movement so that the hold-open means is relieved of any strain. The bent end 35 of the link positively limits the return movement of the cam lever 18 under spring pressure after each deflection, so that the hump 23 is always accurately positioned with respect to the path 26 of the roller 27. In closing the door, the roller 27 can ride up the inclined side 25 of the hump 23 with approximately the same ease as in riding up the inclined side 24 so that there is no more resistance to deflection of the cam lever 18 in the door closing direction than in the door opening direction.

It is believed the foregoing description conveys a good understanding of the objects and advantages of my invention. The appended claims have been drawn to cover all legitimate modifications and adaptations.

I claim:

1. In combination, a hinge comprising a generally U-shaped outer cage member, and an inner member having a gooseneck-shaped end portion pivoted on a pintle disposed substantially at right angles to and supported on the arms of the U-shaped member, the gooseneck portion of said inner member having substantially parallel top and bottom edges, there being a space left between one of said edges of the gooseneck portion and an adjacent arm of the outer member, said gooseneck portion having a projection movable in said space, said hinge members being movable relative to one another through approximately ninety degrees, an elongated lever pivoted intermediate its ends on one arm of the outer member and oscillatable in said space in a plane approximately parallel to the aforesaid edge of the gooseneck portion and adjacent arm of the outer member, said lever having a cam-shaped hold-open projection on one end thereof arranged for lever deflecting engagement by said gooseneck projection in the movement of the inner hinge member to and from full open position, whereby to provide a hold-open action for the inner hinge member in an extreme open position thereof, said lever having a guide projection on the other end thereof, a pin slidable at one end in said guide projection and pivoted at its other end on the pintle, and a compression spring caged on said pin between the guide projection and the pivoted end of the pin to resist deflection of said lever.

2. The combination set forth in claim 1, wherein the guide projection on one end of said lever extends laterally therefrom outwardly with respect to the inner hinge member, and the pin slidable at its one end in said guide projection is disposed on the outer side of one arm of the outer hinge member in substantially parallel relationship thereto and has its other end pivoted on an end portion of the pintle outside the outer hinge member.

3. The combination set forth in claim 1, wherein the pin has an enlarged loop provided on one end thereof in which the end portion of the pintle is received for pivotal connection with the pin, said loop also providing on one side thereof an abutment for one end of said compression spring.

4. The combination set forth in claim 1, wherein that end of the pin slidable in the guide projection has a transversely extending extremity serving as a limit stop for engagement by said guide projection, whereby to maintain the compression spring under a predetermined preload compression and also accurately locate the cam-shaped hold-open projection on said lever for lever deflecting engagement by said gooseneck projection.

5. In combination, a hinge comprising a generally U-shaped outer cage member, and an inner member having a gooseneck-shaped end portion pivoted on a pintle disposed substantially at right angles to and supported on the arms of the U-shaped member, the gooseneck portion of said inner member having substantially parallel top and bottom edges, there being a space left between one of said edges of the gooseneck portion and an adjacent arm of the outer member, said gooseneck portion having a projection movable in said space, said hinge members being movable relative to one another through approximately ninety degrees, an elongated arcuate cam element, the arc of which is struck with the hinge pintle as its center, said plate being pivoted intermediate its ends on one arm of the outer hinge member and oscillatable in said space in a plane approximately parallel to the aforesaid edge of the gooseneck portion and adjacent arm of the outer member, said cam element having a triangular shaped projection on one end for cam deflecting engagement by said gooseneck projection in the movement of the inner hinge member to and from full open position, whereby to provide a hold-open action for the inner hinge member in an extreme open position thereof, said cam having a guide projection on the other end thereof, a pin slidable at one end in said guide projection and pivoted at its other end on the pintle, and a compression spring caged on said pin between the guide projection and the pivoted end of the pin to resist deflection of said cam.

References Cited in the file of this patent

UNITED STATES PATENTS

| | | |
|---|---|---|
| 1,989,487 | McCormick | Jan. 29, 1935 |
| 2,314,416 | Muldoon | Mar. 23, 1943 |
| 2,638,621 | Burke | May 19, 1953 |
| 2,694,828 | Johnson | Nov. 23, 1954 |